(12) United States Patent
Mori

(10) Patent No.: US 6,338,035 B1
(45) Date of Patent: Jan. 8, 2002

(54) VOICE INPUT WORD PROCESSOR

(75) Inventor: Ichiro Mori, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/220,769

(22) Filed: Dec. 28, 1998

(30) Foreign Application Priority Data

Dec. 26, 1997 (JP) .............................. 9-368759

(51) Int. Cl.[7] .......................... G10L 15/22; G10L 15/26
(52) U.S. Cl. ...................................... 704/235; 704/251
(58) Field of Search ............................ 704/231, 251, 704/235

(56) References Cited

U.S. PATENT DOCUMENTS

| | | | | |
|---|---|---|---|---|
| 5,027,406 A | * | 6/1991 | Roberts et al. | 704/244 |
| 5,712,957 A | * | 1/1998 | Waibel et al. | 704/240 |
| 5,829,000 A | * | 10/1998 | Huang et al. | 704/252 |
| 5,855,000 A | * | 12/1998 | Waibel et al. | 704/235 |
| 5,899,976 A | * | 5/1999 | Rozak | 704/270 |

FOREIGN PATENT DOCUMENTS

JP        3-148750        6/1991       ........... G06F/15/20

* cited by examiner

Primary Examiner—Tālivaldis Ivars Šmits
(74) Attorney, Agent, or Firm—Young & Thompson

(57) ABSTRACT

A voice-input document creation system which reduces correction times to a wrongly-recognized input to ensure input efficiency. The system has a determination means for comparing the feature content of a newest voice input extracted by a feature extracting module with a feature content of an immediately preceding voice input to determine if the newest voice input is a correction to the immediately preceding voice input. When a first-time correction is received, the system displays a list of all output candidates for the immediately preceding voice input stored in a second memory. When a second-time correction is received, the system stores the output candidates for the newest voice input into a third memory and, at the same time, displays the output candidates; at this time, the system neither displays nor stores in the third memory those output candidates displayed upon the first-time correction.

6 Claims, 2 Drawing Sheets

VOICE INPUT WORD PROCESSOR

FIELD OF THE INVENTION

The present invention relates to a document creation system such as a word processor or a word processor program executed on a computer, and more particularly to a voice-input document creation system which automatically recognizes voice input data and allows a user to create and edit documents.

BACKGROUND OF THE INVENTION

Conventionally, this type of voice-input document creation system (hereafter called "voice-input word processor") has been used by computer beginners to enter kana-kanji mixed sentences into a computer straightforwardly without using a keyboard. An earlier patent disclosure dealing with this is found in Japanese Patent Kokai Publication JP-A-3-148750. During document creation, the voice-input word processor disclosed in that publication allows a user to correct, via voice input, a wrongly-recognized input upon drafting the sentences. This voice-input word processor has a voice recognition module which recognizes a plurality of output candidates for a context-basis or word-basis voice input. It has a first memory storing a feature content of each entered voice input, a second memory storing a plurality of candidates recognized by the voice recognition module for each voice input, and a correction determination module which compares the feature content of the newest voice input with the feature content saved in the first memory to determine if the newest voice input is the correction of the voice input entered immediately before the last. When the correction determination module determines that the newest voice input is the correction of the input entered immediately before the last, the word processor displays the next candidate saved in the second memory as the recognized result of the newest voice input.

SUMMARY OF THE DISCLOSURE

However, this conventional voice-input word processor has the following problems.

The first problem is that the maximum number of corrections the user must make equals (the number of output candidates minus one).

The reason is that, for the newest voice input, only one candidate is displayed at a time, beginning with the top-priority candidate in the descending order.

The second problem is that, in a case where a voice input is wrongly recognized and no output candidate is the desired clause or word, the user cannot get the desired clause or word even after the corrections noted above.

The reason is that, depending upon how the last input was recognized, the output candidates do not include the desired clause or word. In this case, the conventional word processor requires the user to delete the recognized result of the last input and then to re-enter the voice input, resulting in cumbersome operations and decreased efficiency.

The present invention seeks to solve the problems associated with a prior art described above. It is an objective of the present invention to provide a voice-input document creation system which requires the user to enter a correction to a wrongly-recognized result only up to about two times, thus eliminating the need to enter a correction many times and ensuring input efficiency, operability, and ease of use.

According to a first aspect of the present invention, there is provided a voice input document creation system, particularly a voice-input word processor, which has a speech recognition module for recognizing a plurality of candidates for a clause-basis or a word-basis voice input, wherein when the system receives a voice input equivalent to an immediately preceding voice input, the system assumes that the user has made a correction to the immediately preceding voice input and displays on the screen all the output candidates for the immediately preceding voice input. When the user consecutively makes another correction, the system assumes that there was no desired clause or word in the output candidates and displays a list of output candidates for the newest input.

According to a second aspect, a voice input document creation system comprises: a speech recognition module for recognizing a plurality of output candidates in response to a voice input, means for comparing a feature content of a newest voice input with a feature content of an immediately preceding voice input to determine if the newest voice input is a correction to the immediately preceding voice input, wherein, upon a first-time correction, a list of all output candidates for the immediately preceding voice input is displayed, and wherein, upon a second-time correction, a list of output candidates for the newest voice input is displayed, the list of output candidates excluding output candidates displayed upon the first-time correction.

In a third aspect, a voice input document creation system comprises: means for comparing a feature content of a newest voice input with a feature content of an immediately preceding voice input to determine if the newest voice input is a correction to the immediately preceding voice input; and means for displaying a list of all output candidates for the immediately preceding voice input when the last voice input is determined to be the correction to the immediately preceding voice input on the assumption that the input was retried, and, when the same voice input is entered again, for displaying the list of output candidates for the newest voice input on the assumption that the output candidates do not include a desired clause or word.

In a fourth aspect, a voice input document creation system comprises: an input device receiving voices; a feature extracting device extracting a feature content of a voice input received via the input device; a first memory in which the feature content of the voice input is saved; a second memory in which at least one output candidate for a newest voice input is saved; determination module for comparing the feature content of the newest voice input with the feature content of a voice input immediately preceding the newest voice input saved in the first memory and for determining if the newest voice input is a correction to a voice input immediately preceding the newest; comparison module comparing a feature content of the newest voice input with a feature content of each clause or word stored in a recognition dictionary to select at least one output candidate; a third memory in which the at least one output candidate for a second-time correction is saved; and a display. In this system, when the determination module determines that the newest voice input is the correction to the voice input immediately preceding the newest and when a list of output candidates is not yet displayed, all recognized results of the voice input immediately preceding the newest are displayed on the display as a list of output candidates, the recognized results being saved in the second memory. And, when the determination module determines that the newest voice input is the correction and when the list of output candidates is already displayed, a determination is made that the displayed list of output candidates does not include a desired clause or word and the list of output candidates is replaced by a list of output candidates for the newest voice input.

In a fifth aspect, upon a first-time correction, a list of all output candidates for the voice input immediately before the newest is displayed, the output candidates being saved in the second memory, wherein, upon a second-time correction, output candidates for the newest voice input are saved in the third memory and a list thereof is displayed, the output candidates displayed upon the first-time correction not being included in the list, nor being saved in the third memory.

In a sixth aspect, when the determination means determines that the voice input is not a correction, the feature content of the newest voice input is saved in the first memory for use upon entering of next voice input and, at the same time, all recognized results of the last voice input are saved in the second memory and wherein a top-priority output candidate is displayed at a sentence input location on the display means.

In a seventh aspect, when the determination means determines that the voice input is not a correction and the list of output candidates is already displayed, a determination is made that the list of output candidates does not include a desired clause or word and, when the list of output candidates is replaced by the list of candidates for the newest voice input, the recognized results already saved as the recognized results of the original voice input are not displayed.

In a eighth aspect, there is provided a recording medium having stored therein a program which causes a computer to execute a voice input document creation system having a speech recognition module for recognizing a plurality of output candidates in response to a voice input entered on a clause or word basis. The program comprises:

(a) comparing a feature content of a newest voice input with a feature content of a voice input immediately before the newest to determine if the newest voice input is a correction to the voice input immediately before the newest; and (b) displaying a list of all output candidates for the voice input immediately before the newest when the newest voice input is determined to be a correction to the voice input immediately before the newest on the assumption that the input be retried; and, when the same voice input is subsequently entered again, displaying the list of output candidates for the newest voice input on the assumption that the output candidates did not include a desired clause or word.

PREFERRED EMBODIMENTS OF THE INVENTION

A preferred embodiment of the present invention will be described below. The preferred embodiment of a voice input document creation system according to the present invention is a system having a speech recognition module for recognizing a plurality of output candidates in response to a voice input entered on a clause or word basis, the system comprising (a) means for comparing a feature content of a newest (last) voice input with a feature content of an immediately preceding voice input to determine if the newest voice input is a correction to the immediately preceding voice input; and (b) means for displaying a list of all output candidates for the immediately preceding voice input when the newest voice input is determined to be the correction to the immediately preceding voice input on the assumption that the input was retried, and, when the same voice input is entered again, for displaying the list of output candidates for the newest voice input on the assumption that the output candidates do not include a desired clause or word. In response to the first-time correction, the system displays the list of all output candidates for the immediately preceding voice input and, in response to the second-time correction, displays the list of output candidates for the newest voice input. In this case, those output candidates displayed for the first-time correction are not displayed for the second-time correction.

The above-described means (a) and (b) may be implemented by a program which runs on a computer with the speech recognition function which functions as a voice-input word processor.

Figure 1:
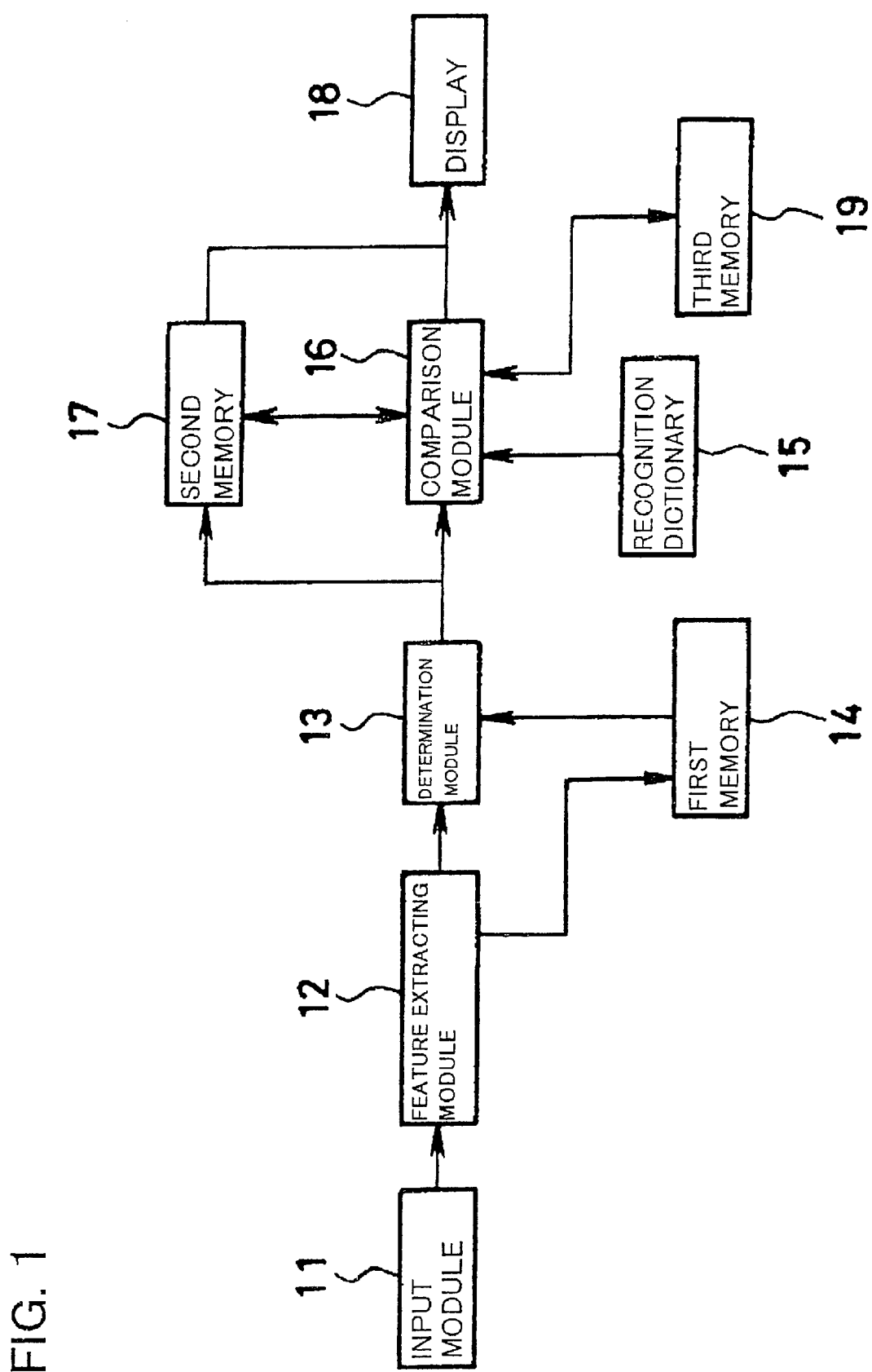
FIG. 1 is a diagram showing the configuration of an embodiment according to the present invention.

The following describes more in detail an embodiment of the present invention with reference to the drawings. FIG. 1 is a diagram showing the configuration of the embodiment according to the present invention. As shown in FIG. 1, a correction determination module (13) compares a feature content of the newest (last) voice input with that of an immediately preceding voice input (voice input immediately before the last) that was saved in a first memory (14). For example, the module calculates the distance between the two to determine if the newest voice input was a correction to the voice input immediately before the last.

When the correction determination module (13) determines that the newest voice input was not a correction, it saves the feature content of the newest voice input into the first memory (14) for later comparison with that of the subsequent input. At the same time, the module saves the recognized result of the newest voice input into a second memory 17 and displays the first output candidate of the voice-input at the sentence input location on a display (18).

On the other hand, when the correction determination module (13) determines that the newest voice input is a correction but when the output candidate list is not yet displayed, the module displays on the display (18) the list of all output candidates of the voice input immediately preceding the newest which are saved in the second memory (17). Then, the user may specify, with a voice, an item number attached to each output candidate to correct the clause or the word to a desired one.

When the correction determination module (13) finds that the newest voice input is a correction and when the output candidate list is already displayed, the module determines that the newest voice input is the second-time correction and that the output candidate list did not contain a desired clause or a word. Then, the module replaces the current output candidate list with the output candidate list of the newest voice input. In this case, the module does not display a duplicated (i.e., duplicated with the previous one) recognized result which is already in the second memory (17).

As in the first-time correction, the user may specify, with a voice, an item number attached to each output candidate to correct the clause or the word to a desired one.

The system described above allows the user to correct a wrongly-recognized clause or word without having to enter the correction many times.

To describe the preferred embodiment of the present invention more in detail, an embodiment of the present invention is described below with reference to the drawings. As shown in FIG. 1, the embodiment comprises an input module 11, a feature extracting module 12, a determination module 13, a first memory 14, a recognition dictionary 15, a comparison module 16, a second memory 17, a display 18, and a third memory 19.

The input module 11 of this voice-input word processor comprises a voice input device such as a microphone.

The feature extracting module 12 comprises a device, such as a spectrum analyzer, which converts a voice input to digital signals, processes signals, and extracts feature content.

The first memory 14 is a memory in which the feature content information on the voice input extracted by the feature extracting module 12 is saved.

The determination module 13 compares a feature content of the newest voice input with a feature content of the immediately preceding voice input that is saved in the first memory (14), for example, compares the distance between the two, to determine if the newest voice input is a correction.

The comparison module 16 compares the feature content of the newest voice input with the feature content of each clause or word stored in the recognition dictionary 15 allocated on a device, such as a magnetic disk, and selects an output candidate or candidates from the recognition dictionary 15.

The second memory 17 is a memory, such as a random access memory, in which the output candidates for the newest voice input are saved.

The display 18 is a display on which output candidates are displayed in the character format.

The third memory 19 is a memory, such as a random access memory, in which the output candidates of the second-time correction are saved.

Figure 2:
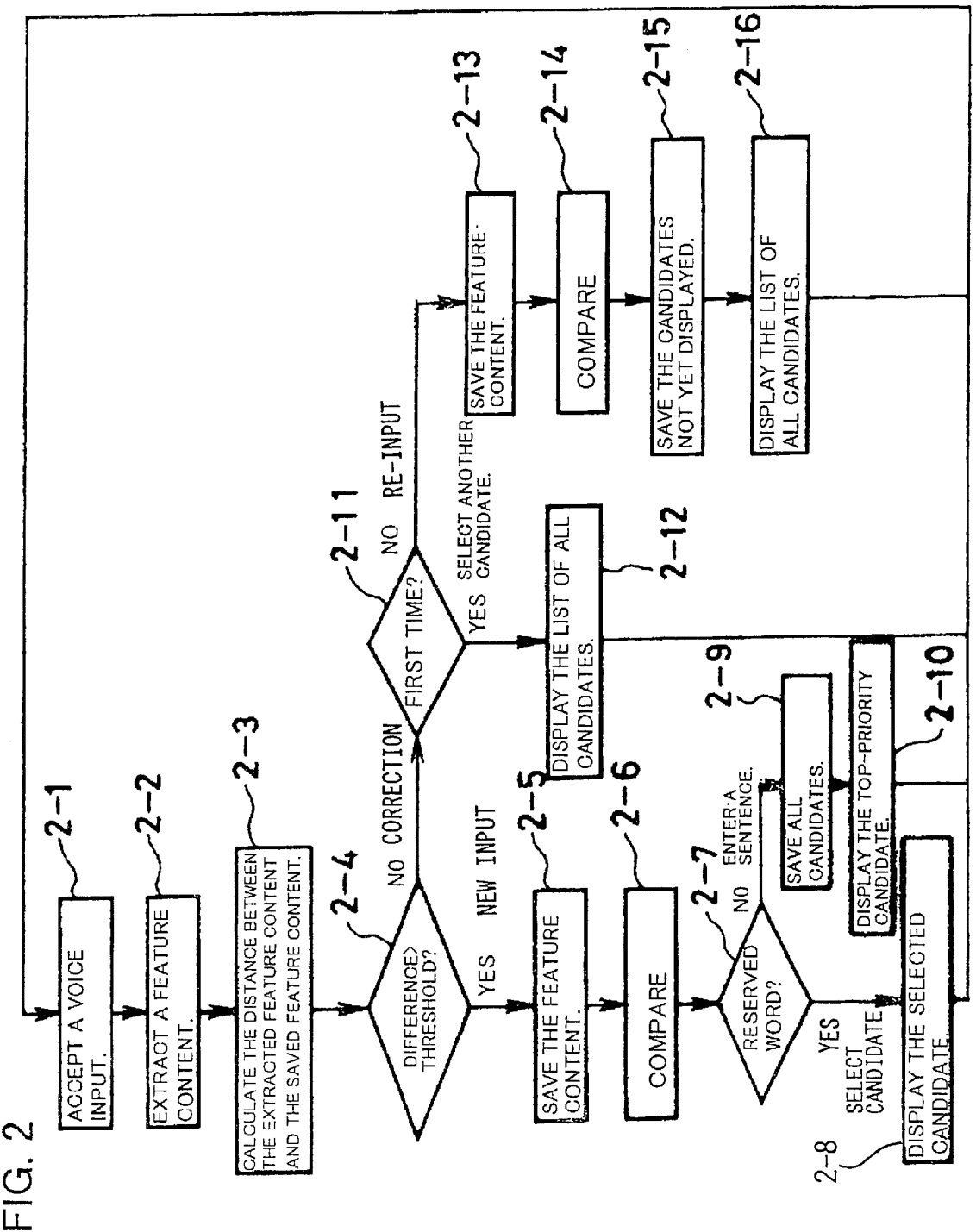
FIG. 2 is a flowchart showing the operation of the embodiment according to the present invention.

FIG. 2 is a flowchart showing the processing flow of the embodiment according to the present invention. The following describes in detail the operation of the embodiment with reference to FIGS. 1 and 2.

Upon receiving a voice input, the input module 11 detects it in step 2-1, and the feature extracting module 12 extracts a feature content of the voice input in step 2-2.

In step 2-3, the determination module 13 compares the feature content of the newest voice input with a content of the first memory 14, that is, with the feature content of the voice input immediately preceding the newest, to calculate the difference between the two feature contents.

In step 2-4, a determination is made to see if the difference exceeds the threshold. If the difference exceeds the threshold, the voice input is assumed to be a "new" voice input and control is passed to step 2-5.

In step 2-5, the feature content of the new voice input is saved in the first memory 14. In step 2-6, the comparison module 16 compares the feature content of the new voice input with that of each clause or word stored in the recognition dictionary 15 and selects the output candidates which have a higher similarity to the new voice input. The output candidates are numbered in the descending order of similarity.

In step 2-7, a check is made to see if the recognized result matches a reserved word which is a command used by the user to select a number from the output candidate list. If the recognized result is not a reserved word, control is passed to step 2-9.

In step 2-9, all selected output candidates are saved in the second memory 17.

Then, control is passed to step 2-10. The first output candidate is sent to the display 18 and is displayed next to the character(s) of the voice input immediately preceding the newest. After that, control goes back to step 2-1 to accept the next input.

On the other hand, if the difference between the two feature contents does not exceed the threshold in step 2-4, it can be understood that the newest voice input is very similar to the voice input immediately preceding the newest and therefore the newest voice input be a correction to the immediately preceding voice input. In this case, control is passed to step 2-11.

In step 2-11, a check is made to see if the correction is a first-time correction or a second-time correction. If the correction is a first-time correction, control is passed to step 2-12.

In step 2-12, all output candidates saved in the second memory 17 are sent to the display 18 and the list of output candidates is displayed near the character(s) displayed as the recognized result of the immediately preceding voice input. Control is then passed to step 2-1 for waiting (accepting) a next input. Upon the next voice input, if, in step 2-7, the next input (voice input) is determined to be a reserved word, control is passed to step 2-8. In step 2-8, the character(s) displayed before the correction is/are replaced by a candidate(s), assuming that the candidate(s) indicated by the order number of the reserved word is/are selected.

On the other hand, if the correction is determined to be a second-time correction in step 2-11, control is passed to step 2-13 assuming that the voice of this time has been re-input instead of the original (initial) voice input.

In step 2-13, a feature content of this new input is saved in the first memory 14. In step 2-14, the comparison module 16 compares a feature content of the new (current) voice input with that of each clause or word stored in the recognition dictionary 15 and selects output candidates which are similar to the new voice input. The output candidates are numbered in the descending order of similarity.

Next, control is passed to step 2-15 and the selected output candidates are saved in the third memory 19. It should be noted that the output candidates which were displayed upon the first-time correction and which have been already stored in the second memory 17 are not saved in the third memory 19.

In step 2-16, all output candidates are sent from the third memory 19 to the display 18, the list of output candidates for the second-time correction are displayed on the display 18, and then control is passed back to step 2-1 to wait for a next input. Upon the next input, if the next input (voice input) is determined to be a reserved word in step 2-7, control is passed to step 2-8. In step 2-8, the character(s) displayed before entering the correction is/are replaced by a candidate (s) corresponding the item number of the reserved words, likewise when control is passed to step 2-12.

As described above, when a first-time correction is entered to a certain voice input, the list of all output candidates for the immediately preceding voice input is displayed to allow the user to select a desired one from the list upon the next input. When a second-time correction is entered, the list of all the output candidates, except those included in the output candidate list displayed in response to the first-time correction, is displayed, assuming that a desired clause or word be not included in the output candidates displayed for the first-time correction. In this case, the user may also select any one of the candidates by the next input.

Thus, this word processor enables the user to correct a wrongly-recognized clause or word without having to repeat corrections many times.

As mentioned, the present invention reduces the number of times the user has to enter a correction to an wrongly-recognized result up to two times or so, ensuring better input efficiency, operability, and ease of use.

The reason is that, when a correction (last correction) is made to what was entered, the embodiment according to the present invention displays the list of all output candidates for the immediately preceding voice input to allow the user to specify, with a voice, the item number of each candidate included in the list, thus enabling the user to instantly select a desired clause or word.

The second advantage is that the user may re-enter the immediately preceding voice input from the beginning. As a result, a situation in which a desired clause or word cannot be obtained even after several corrections, which was one of the problems with the conventional technology, can be avoided.

The reason is that, when a second-time correction is made, the recognized result of the original voice input is replaced by the recognized result of the second-time correction. That is, in this embodiment, in case where the second-time correction is made after the first-time correction for which all candidates for the original voice input have been displayed, the original voice input can be assumed to have been wrongly recognized. Therefore, the original voice input is canceled and is replaced by the recognized result of the current voice input.

It should be noted that other objects of the present invention will become apparent in the entire disclosure and that modifications may be done without departing the gist and scope of the present invention as disclosed herein and appended herewith.

Also it should be noted that any combination of the disclosed and/or claimed elements, matters and/or items may fall under the modifications aforementioned.

What is claimed is:

1. A voice input document creation system having a speech recognition module for recognizing a plurality of output candidates in response to a voice input entered on a clause or word basis the system comprising:

means for comparing a feature content of a newest voice input with a feature content of an immediately preceding voice input to determine if the newest voice input is a correction to the immediately preceding voice input, wherein, upon a first-time correction, a list of all output candidates for the immediately preceding voice input is displayed, and wherein, upon a second-time correction with the list of all output candidates displayed, a list of output candidates for the newest voice input is displayed, said list of output candidates for the second-time correction excluding output candidates displayed upon the first-time correction.

2. A voice input document creation system having a speech recognition module for recognizing a plurality of output candidates in response to a voice input entered on a clause or word basis, the system comprising:

means for comparing a feature content of a newest voice input with a feature content of an immediately preceding voice input to determine if the newest voice input is a correction to the immediately preceding voice input; and means for displaying a list of all output candidates for the immediately preceding voice input when the newest voice input is determined to be the correction to the immediately preceding voice input on the assumption that the input was retried, and when the same voice input is entered again with the list of all output candidates displayed, for displaying the list of output candidates for the newest voice input excluding output candidates from the first displayed list of output candidates.

3. A voice input document creation system comprising:

input means for receiving speech;

feature extracting means for extracting a feature content of a voice input received via the input means;

a first memory in which the feature content of the voice input is saved;

a second memory in which at least one output candidate for a newest voice input is saved;

determination means for comparing the feature content of the newest voice input with the feature content of a voice input immediately preceding the newest voice input saved in the first memory and for determining if the newest voice input is a correction to a voice input immediately preceding the newest;

comparison means for comparing a feature content of the newest voice input with a feature content of each clause or word stored in a recognition dictionary to select at least one output candidate;

a third memory in which said at least one output candidate for a second-time correction is saved; and display means, wherein, when the determination means determine that the newest voice input is the correction to the voice input immediately preceding the newest and when a list of output candidates is not yet displayed, all recognized results of the voice input immediately preceding the newest are displayed on the display means as a list of output candidates, said recognized results being saved in the secondary memory, and wherein, when the determination means determine that the newest voice input is the correction and when the list of output candidates is already displayed, a determination is made that the displayed list of output candidates does not include a desired clause or word and the list of output candidates is replaced by a list of output candidates for the newest voice input, and wherein, upon a first-time correction, a list of all output candidates for the voice input immediately before the newest is displayed, said output candidates being saved in the second memory, and wherein, upon a second-time correction, output candidates for the newest voice input are saved in the third memory and a list thereof is displayed, the output candidates displayed upon the first-time correction not being included in said list, nor being saved in said third memory.

4. A voice input document creation system as defined by claim 3 wherein, when said determination means determines that the voice input is not a correction, the feature content of said newest voice input is saved in said first memory for use upon entering of next voice input and, at the same time, all recognized results of the newest voice input are saved in said second memory and wherein a top-priority output candidate is displayed at a sentence input location on the display means.

5. A voice input document creation system as defined by claim 3 wherein, when said determination means determines that the voice input is not a correction and the list of output candidates is already displayed, a determination is made that of output candidates does not include a desired clause or word and, when the list of output candidates is replaced by the list of the newest voice input, the recognized results already saved as the recognized results of the original voice input are not displayed.

6. A recording medium having stored therein a program which causes a computer to execute a voice input document creation system having a speech recognition module for recognizing a plurality of output candidates in response to a voice input entered on a clause or word basis, the program comprising instructions for:

(a) comparing a feature content of a newest voice input with a feature content of a voice input immediately before the newest to determine if the newest voice input is a correction to the voice input immediately before the newest; and (b) displaying a list of all output candidates for the voice input immediately before the newest when the newest voice input is determined to be a correction to the voice input immediately before the newest on the assumption that the input be retired; and when the same voice input is subsequently entered again with the list of all output candidates displayed, displaying the list of output candidates for the newest voice input excluding output candidates from the first displayed list of output candidates.

* * * * *